(12) United States Patent
Saito

(10) Patent No.: US 7,546,279 B2
(45) Date of Patent: Jun. 9, 2009

(54) PROBLEM INFORMATION ANALYSIS PROGRAM, PROBLEM INFORMATION ANALYSIS APPARATUS AND PROBLEM INFORMATION ANALYSIS METHOD

(75) Inventor: Takahiro Saito, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 331 days.

(21) Appl. No.: 11/380,276

(22) Filed: Apr. 26, 2006

(65) Prior Publication Data
US 2007/0174226 A1 Jul. 26, 2007

(30) Foreign Application Priority Data
Jan. 24, 2006 (JP) ............................ 2006-014679

(51) Int. Cl.
G06E 1/00 (2006.01)
G06F 15/00 (2006.01)
(52) U.S. Cl. ........................................................ 706/20
(58) Field of Classification Search .................. 706/20, 706/924
See application file for complete search history.

(56) References Cited

U.S. PATENT DOCUMENTS

2001/0027389 A1* 10/2001 Beverina et al. ............... 703/22

FOREIGN PATENT DOCUMENTS

| JP | 9-114801 | 5/1997 |
|----|----------|--------|
| JP | 2002-236692 | 8/2002 |
| JP | 2003-99601 | 4/2003 |
| JP | 2005-100026 | 4/2005 |

* cited by examiner

Primary Examiner—David R Vincent
Assistant Examiner—Nathan H Brown, Jr.
(74) Attorney, Agent, or Firm—Fujitsu Patent Center

(57) ABSTRACT

A computer executable problem information analysis program for the purpose of being carried out by a problem information analysis apparatus, which searches problem information corresponding to a search condition, by referring to a problem information database storing problem information that includes a category, an occurrence condition and a source cause of a problem and a practiced countermeasure therefor, wherein the program makes the problem information analysis apparatus execute the procedure of calculating a degree of difficulty of avoiding a problem, which indicates a difficulty of avoiding a problem, based on the number of source causes of the problem searched from the problem information database, thereby providing a problem information analysis program, a problem information analysis apparatus and a problem information analysis method enabling an appropriate judgment of a degree of difficulty of avoiding a problem based on various causes noted in each problem case information.

19 Claims, 9 Drawing Sheets

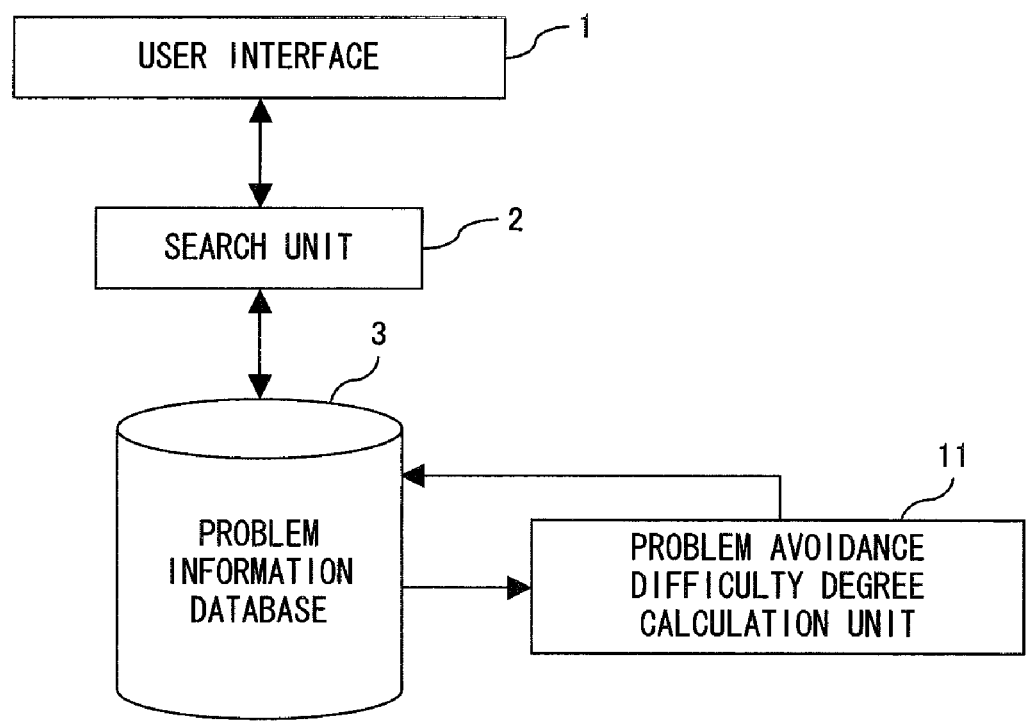
F I G. 1

| ID | | 0001 |
|---|---|---|
| OCCURRENCE DATE & TIME | OCCURRENCE MONTH | 1 |
| | OCCURRENCE DAY OF WEEK | WEDNESDAY |
| | DATE CATEGORY | HOLIDAY |
| | OCCURRENCE TIME RANGE | 8 TO 9 PM |
| PATIENT INFORMATION | PATIENT GENDER | MALE |
| | PATIENT AGE | 7 2 |
| | PATIENT PHYSICAL AND MENTAL CONDITIONS | REST IN BED |
| INFORMAITON ON PERSON IN CHARGE AND DISCOVERER | DISCOVERER | SAME JOB TITLE |
| | JOB TITLE OF PERSON IN CHARGE | NURSE |
| | YEARS OF EXPERIENCE AS THE JOB TITLE | LESS THAN ONE YEAR |
| | YEARS OF WORK IN CURRENT POST | LESS THAN ONE YEAR |
| PROBLEM SUMMARY | OCCURRENCE PLACE | PATIENT ROOM |
| | OCCURRENCE CONDITION | INFECTION AND DRIP INFUSION |
| | PROBLEM CATEGORY | MISTAKEN ADMINISTRATION OF MEDICINE |
| | CAUSE CATEGORY | MIS-OPERATION OF EQUIPMENT |
| | PRESENCE OR ABSENCE OF PREVINTIVE MEASURE | WRITTEN PROCEDURE NAMUAL |
| | COUNTERMEASURE | ENFORCE THE PROCEDURE |
| PROBLEM DETAILS | DURING ADMINISTRATION OF SIGMART 48mg2V PLUS SALINE 96cc BY AN INFUSION PUMP AT 4cc/hr., A MEDICINE WAS INFECTED INTO THE QUANTIFIER CYLINDER AND ALL WERE INFUSED IN FIVE MINUTES··· | |

Rows above "PROBLEM DETAILS": FIXED PATTEN, NUMERICAL INFORMATION DESCRIPTION FIELD "PROBLEM DETAILS" row: UNFIXED PATTERN INFORMATION (TEXT) DESCRIPTION FIELD

F I G. 4

| ID | 0001 | |
|---|---|---|
| DATE, PATIENT INFORMATION AND OTHER FIXED PATTERN ITEM INFORMATION | | |
| PROBLEM SUMMARY | OCCURRENCE PLACE | PATIENT ROOM |
| | OCCURRENCE CONDITION | INJECTION AND DRIP INFUSION |
| | PROBLEM CATEGORY | MISTAKEN MEDICINE ADMINISTRATION |
| | CAUSE CATEGORY | MIS-OPERATION OF EQUIPMENT |
| | PRESENCE OR ABSENCE OF PREVENTIVE MEASURE AND ITS CONTENT | WRITTEN PROCEDURE MANUAL |
| | COUNTERMEASURE | ENFORCE THE PROCEDURE |
| | COUNTERMEASURE COST | C |
| | EFFECTIVENESS | C |
| PROBLEM DETAILS | DURING ADMINISTRATION OF SIGMART 48mg2V PLUS SALINE 96cc BY AN INFUSION PUMP AT 4cc/hr., A MEDICINE WAS INJECTED INTO THE QUANTIFIER CYLINDER AND ALL WERE INFUSED IN FIVE MINUTES・・・ | |

| ID | 0002 | |
|---|---|---|
| DATE, PATIENT INFORMATION AND OTHER FIXED PATTERN ITEM INFORMATION | | |
| PROBLEM SUMMARY | OCCURRENCE PLACE | NURSE STATION |
| | OCCURRENCE CONDITION | INJECTION AND DRIP INFUSION |
| | PROBLEM CATEGORY | MISTAKEN MEDICINE ADMINISTRATION |
| | CAUSE CATEGORY | PROCEDURE NOT FOLLOWED AND MISCOMMUNICATION |
| | PRESENCE OR ABSENCE OF PREVENTIVE MEASURE AND ITS | NURSE CHECK |
| | COUNTERMEASURE | ENFORCE THE PROCEDURE |
| | COUNTERMEASURE COST | C |
| | EFFECTIVENESS | C |
| PROBLEM DETAILS | NORMALLY START PREPARING AT AROUND 2PM FOR A DRIP INFUSION IN THE EVENING, WHILE WORK SCHEDULE IS VERY BUSY ON EVERY MONDAY, AND THEREFORE START PREPARING AT 10AM FOR AN INFUSION IN THE EVENING BY PREDICTING FOR BEING BUSY・・・ | |

| ID | 0003 | |
|---|---|---|
| DATE, PATIENT INFORMATION AND OTHER FIXED PATTERN ITEM INFORMATION | | |
| PROBLEM SUMMARY | OCCURRENCE PLACE | TREATMENT ROOM |
| | OCCURRENCE CONDITION | INJECTION AND DRIP INFUSION |
| | PROBLEM CATEGORY | MISTAKEN MEDICINE ADMINISTRATION |
| | CAUSE CATEGORY | MANUAL SHOTCOMING AND MISCOMMUNICATION |
| | PRESENCE OR ABSENCE OF PREVENTIVE MEASURE AND ITS CONTENT | WRITTEN COMMUNICATION |
| | COUNTERMEASURE | MAKE MANUAL AND NOTIFY |
| | COUNTERMEASURE COST | B |
| | EFFECTIVENESS | B |
| PROBLEM DETAILS | WAS PREPARING FOR A DRIP INFUSION TO A PATIENT BEING PLANNED FOR NERVE ROOT BLOCK IN ORDER TO SECURE BLOOD VESSEL・・・ | |

FIG. 5

| ID | | 0001 |
|---|---|---|
| FIXED PATTERN INFORMATION IN THE ORIGINAL DB RECORD ||| 
| PROBLEM AVOIDANCE DIFFICULTY DEGREES | VIEWPOINT 1 (SOURCE CAUSE) | 2 |
| | VIEWPOINT 2 (OCCURRENCE CONDITION) | 3 |
| | VIEWPOINT 3 (COUNTERMEASURE) | 2 |
| | VIEWPOINT 4 (PREVENTIVE MEASURE) | 5 |
| | VIEWPOINT 5 (COUNTERMEASURE COST) | 1 |
| | VIEWPOINT 6 (COUNTERMEASURE EFFECTIVENESS) | 4 |
| PROBLEM DETAILS | DURING ADMINISTRATION OF SIGMART 48mg2V PLUS SALINE 96cc BY AN INFUSION PUMP AT 4cc/HR., A MEDICINE WAS INJECTED INTO THE QUANTIFIER CYLINDER AND ALL WERE INFUSED IN FIVE MINUTES · · · ||

AVOIDANCE DIFFICULTY DEGREE INFORMATION BASED ON AN INFORMATION BASED ON AN INTEGRATED REFERENCE

F I G. 6

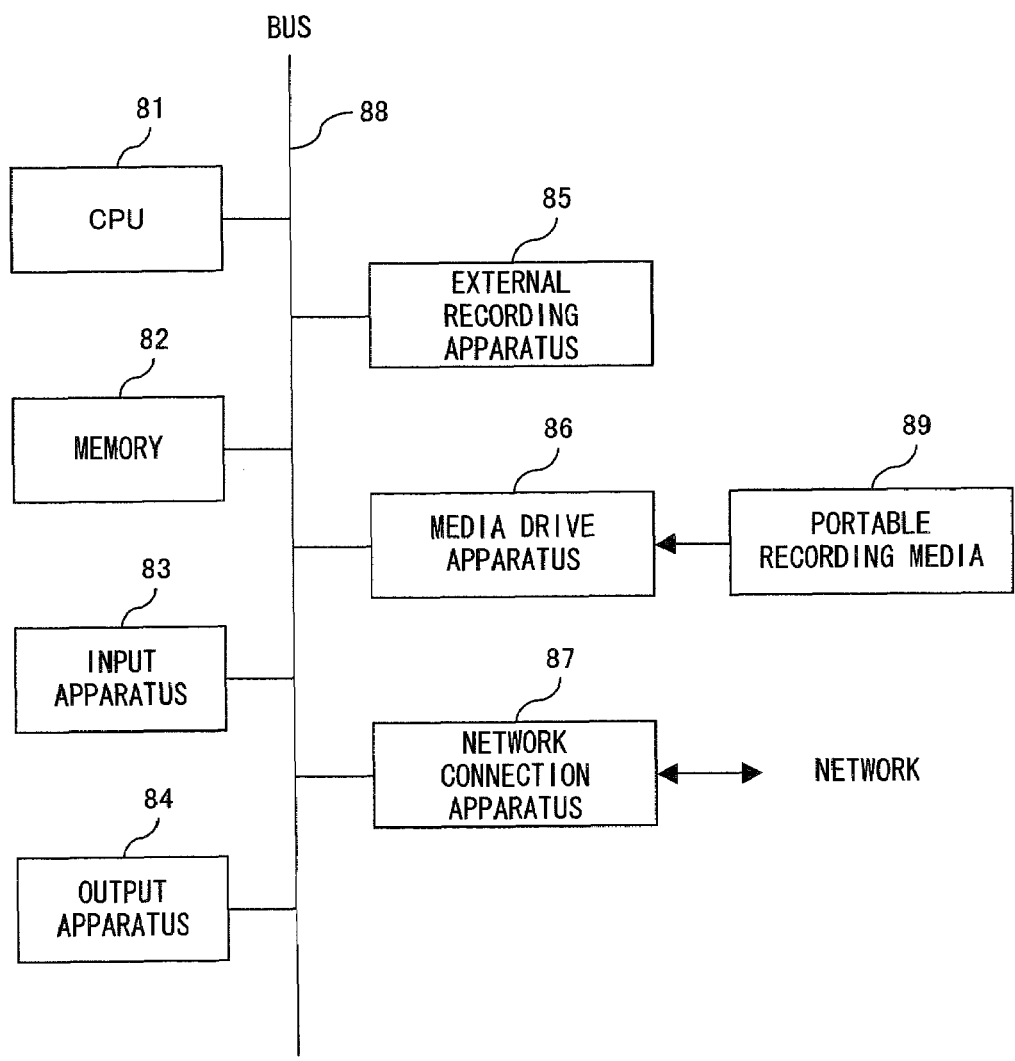
F I G. 8

US 7,546,279 B2

PROBLEM INFORMATION ANALYSIS PROGRAM, PROBLEM INFORMATION ANALYSIS APPARATUS AND PROBLEM INFORMATION ANALYSIS METHOD

BACKGROUND OF THE INVENTION

1. Field of the Invention

The present invention relates to a computer executable problem information analysis program for the purpose of making a problem information analysis apparatus for analyzing problem information of various phenomena, a problem information analysis apparatus and a problem information analysis method which is carried out by the problem information analysis apparatus, and in particular to the problem information analysis program, problem information analysis apparatus and problem information analysis method for analyzing problem information such as incident information occurring in a medical practice site, failure information occurring in a development of a computer software program, accident information occurring during operations of a large scale plant for a power generation plant or a factory.

2. Description of the Related Art

In recent years, a risk management has become increasingly important. The risk management is defined as clarifying problems which possibly occur in advance and determining countermeasures for each problem in advance, for which historical problem information is utilized. If such historical problem information is in a small quantity, a person or persons can grasp its entirety, whereas if many facts are accumulated, a computer becomes a necessity for assisting to utilize them.

For example, a Laid-Open Japanese Patent Application Publication No. 09-114801 has disclosed a technique for use in an apparatus for evaluating a risk relating to a business enterprise for presenting, to a client, historical problem(s) that happened in a similar business enterprise with its degree of effect and that of reducing it by covering with an insurance, by using information, as input, relating to the enterprise such as the type of business, size and financial information of the business enterprise as a subject of evaluation.

And a Laid-Open Japanese Patent Application Publication No. 2003-99601 has disclosed a technique used in an apparatus, for evaluating a risk relating to a facility, for calculating a probability of problem occurrence from historical problem cases and a degree of influence at a problem occurrence and presenting them to a client by using facility information of a facility as a subject of evaluation and information of the surrounding area as input.

And a Laid-Open Japanese Patent Application Publication No. 2005-100026 has disclosed a technique for enabling an automatic extraction of monitoring item(s) for monitoring a condition of an apparatus by evaluating a failure cause and monitoring item(s), respectively, relating to the apparatus having a plurality of failure causes and a plurality of monitoring items.

The conventional technique, however, was face with an issue (N.B.: in order to avoid confusion with "problem" as a subject of requiring a solution, the word "issue" is used for the same semantic as a problem in this specification) of being unable to calculate information (i.e., a degree of difficulty of avoiding a problem) for indicating how difficult it is to solve a problem, while it was possible to calculate information such as a likelihood of a problem occurrence and an influence of the problem once it should occur.

This information is of the same importance as the one calculable by the conventional technique which enables an analyst to acquire useful knowledge by carrying out an analysis if there is such information. However, an appropriate value of the degree of difficulty of avoiding a problem is difficult to calculate by merely examining each problem case independently. For instance, similar problem may have occurred due to different causes. In order to prevent such issues, countermeasures must be taken for all these plural causes. Consequently, it is not possible to understand a plurality of causes from only one problem, thus being faced with an issue of being unable to evaluate a degree of difficulty of avoiding the problem.

Meanwhile, considering using a degree of difficulty of avoiding a problem for planning a countermeasure, the degree of difficulty of avoiding a problem is useful if it is defined based on various view points. For instance, a degree of difficulty of avoiding a problem based on a view point of "a problem for which a practical cost of the countermeasure is high has a high degree of difficulty of avoiding a problem" is useful to implement a risk management with a high cost performance. And a degree of difficulty of avoiding a problem based on a view point of "a problem which occurred despite a countermeasure had been taken has a high degree of difficulty of avoiding a problem" is useful for a task to extract an inadequacy of the past risk management.

Incidentally, a technique called an automatic categorization using a mechanical learning is widely used as a method for estimating an attribute of each data (i.e., this corresponds to a degree of difficulty of avoiding a problem noted in a problem case according to an example of the present invention). According to this technique, an apparatus is disposed to learn a small number of problem cases invested respectively with correct solutions in advance as teacher data and estimate a category regarding a problem case not invested with a category based on the aforementioned learning result. In order to apply the technique to a judgment of a degree of difficulty of avoiding a problem, however, such teacher data must be created, thus bringing about a problem of being unable to create appropriate teacher data because a creation of the teacher data requires a cost and also a provision of an appropriate difficulty of a problem to each problem case is difficult even by spending a manpower.

SUMMARY OF THE INVENTION

A purpose of the present invention, considering the above described circumstances, is to provide a problem information analysis program, a problem information analysis apparatus and a problem information analysis method which enable an appropriate judgment of a degree of difficulty of avoiding a problem based on various causes of a problem noted in respective problem case information.

Another purpose of the present invention is to provide a problem information analysis program, a problem information analysis apparatus and a problem information analysis method which enable an implementation of a method for acquiring useful knowledge used for a valuable risk management by using the judged degree of difficulty of avoiding a problem.

In order to solve the above described issues, the present invention is configured as described in the following.

That is, a problem information analysis program according to one aspect of the present invention is a computer executable problem information analysis program for the purpose of being carried out by a problem information analysis apparatus, which searches problem information corresponding to a search condition, by referring to a problem information database storing problem information that includes a category, an occurrence condition and a source cause of a problem and a practiced countermeasure therefore, wherein the program makes the problem information analysis apparatus execute the procedure of calculating a degree of difficulty of avoiding a problem, which indicates a difficulty of avoiding a problem, based on the number of source causes of the problem searched from the problem information database.

And the problem information analysis program according to the present invention is preferably configured such that the procedure of calculating a degree of difficulty of avoiding a problem calculates the degree based on an information entropy calculated from the number of source causes and number of occurrences of the problem.

And the problem information analysis program according to the present invention is preferably configured such that the procedure of calculating a degree of difficulty of avoiding a problem calculates the degree based on the number of occurrence conditions of the problem.

And the problem information analysis program according to the present invention is preferably configured such that the procedure of calculating a degree of difficulty of avoiding a problem calculates the degree based on the number of possible preventive measures for the problem.

And the problem information analysis program according to the present invention is preferably configured such that the procedure of calculating a degree of difficulty of avoiding a problem calculates the degree based on a presence or absence of taking a preventive measure for the problem.

And the problem information analysis program according to the present invention is preferably configured such that the procedure of calculating a degree of difficulty of avoiding a problem calculates the degree based on a high- or low cost of taking a preventive measure for the problem.

And the problem information analysis program according to the present invention is preferably configured such that the procedure of calculating a degree of difficulty of avoiding a problem calculates the degree based on a degree of effectiveness of a taken preventive measure for the problem.

By so doing, it is further possible to calculate a degree of difficulty of avoiding a problem from various view point based on information relating to various factors, which are noted in a DB of a problem analysis apparatus and determine the degree of difficulty of avoiding a problem, and more appropriately judge the degree of difficulty of avoiding a problem based on various factors of a problem noted by each problem case information as compared to the problem analysis apparatus invested with the content of problem case information in a countable form.

And the problem information analysis program according to the present invention preferably further comprises the procedures of grouping categories of the problem based on a degree of difficulty of avoiding a problem calculated by the procedure of calculating the degree; extracting a characteristic element stored by the problem information data base relating to a category of the problem which is grouped by the grouping procedure; and outputting a characteristic element extracted by the procedure of extracting the characteristic element.

By so doing, it is possible to implement a method for acquiring valuable knowledge for a useful risk management by assisting an analysis work of a user and using a judged degree of difficulty of avoiding a problem as a result of categorizing problem cases by the degrees of difficulty of avoiding a problem and presenting typical items characterizing each part group and key words or phrases in a text to the user.

Meanwhile, a problem information analysis method according to another aspect of the present invention is the one carried out by a problem information analysis apparatus, which searches problem information corresponding to a search condition, by referring to a problem information data base storing problem information that includes a category, an occurrence condition and a source cause of a problem and a practiced countermeasure therefore, calculating a degree of difficulty of avoiding a problem, which indicates a difficulty of avoiding a problem, based on the number of source causes of the problem searched from the problem information database.

By so doing, it is further possible to calculate a degree of difficulty of avoiding a problem from various viewpoint based on information relating to various factors, which are noted in a DB of a problem analysis apparatus and determine the degree of difficulty of avoiding a problem, and more appropriately judge the degree of difficulty of avoiding a problem based on various factors of a problem noted by each problem case information as compared to the problem analysis apparatus invested with the content of problem case information in a countable form.

Meanwhile, a problem information analysis apparatus according to yet another aspect of the present invention is the one which searches problem information corresponding to a search condition by referring to a problem information database storing problem information that includes a category, an occurrence condition and a source cause of a problem and a practiced countermeasure therefore, comprising a problem avoidance difficulty calculation unit for calculating a degree of difficulty of avoiding a problem which indicates a difficulty of avoiding the problem based on the number of source causes of the problem searched from the problem information database.

By so doing, it is further possible to calculate a degree of difficulty of avoiding a problem from various view point based on information relating to various factors, which are noted in a DB of a problem analysis apparatus and determine the degree of difficulty of avoiding a problem, and more appropriately judge the degree of difficulty of avoiding a problem based on various factors of a problem noted by each problem case information as compared to the problem analysis apparatus invested with the content of problem case information in a countable form.

BRIEF DESCRIPTION OF THE DRAWINGS

FIG. 1 describes a concept of the present invention;

FIG. 4 exemplifies problem case data of a problem information database;

FIG. 5 exemplifies a record within a problem information database relating to a problem category, i.e., "mistaken administration of medicine";

FIG. 6 exemplifies an addition of a calculated degree of difficulty of avoiding a problem to a problem information database;

FIG. 8 shows a hardware configuration of a problem information analysis apparatus according to the present invention.

DESCRIPTION OF THE PREFERRED EMBODIMENTS

The following is a description of the preferred embodiment applied by the present invention by referring to the accompanying drawings.

FIG. 1 describes a concept of the present invention.

Referring to FIG. 1, a user interface 1 constituting a standard database system (DB system), a search unit 2 and a problem information database 3 can appropriate a DB system by a conventional technique as is. Note that a premise here is that each problem case record stored by the problem information database 3 according to the present invention is invested with fixed pattern information which indicates detailed contents of a problem such as a category and cause of the problem. Although such information may be manually invested, it is also possible to invest from a text whose details are noted by using a known technique by a Laid-Open Japanese Patent Application Publication No. 2002-236692.

That is, the present invention comprises a problem avoidance difficulty degree calculation unit 11 for judging a degree of difficulty of avoiding a problem based on various view points by grouping all problem cases, according to categories of the problems, stored by the problem information database 3, in addition to the conventional DB system comprising the problem information database 3 for storing problem cases invested with contents of problems as fixed pattern information, search unit 2 for searching the problem information database following a reception of an operation instruction from a user and a user interface 1. The most significant characteristic of the present invention is the fact that the problem avoidance difficulty degree calculation unit 11 is added to the above noted DB system. The problem avoidance difficulty degree calculation unit 11 carries out the process of judging a degree of difficulty of avoiding a problem according to countable fixed pattern information attached to problem cases.

Figure 2:
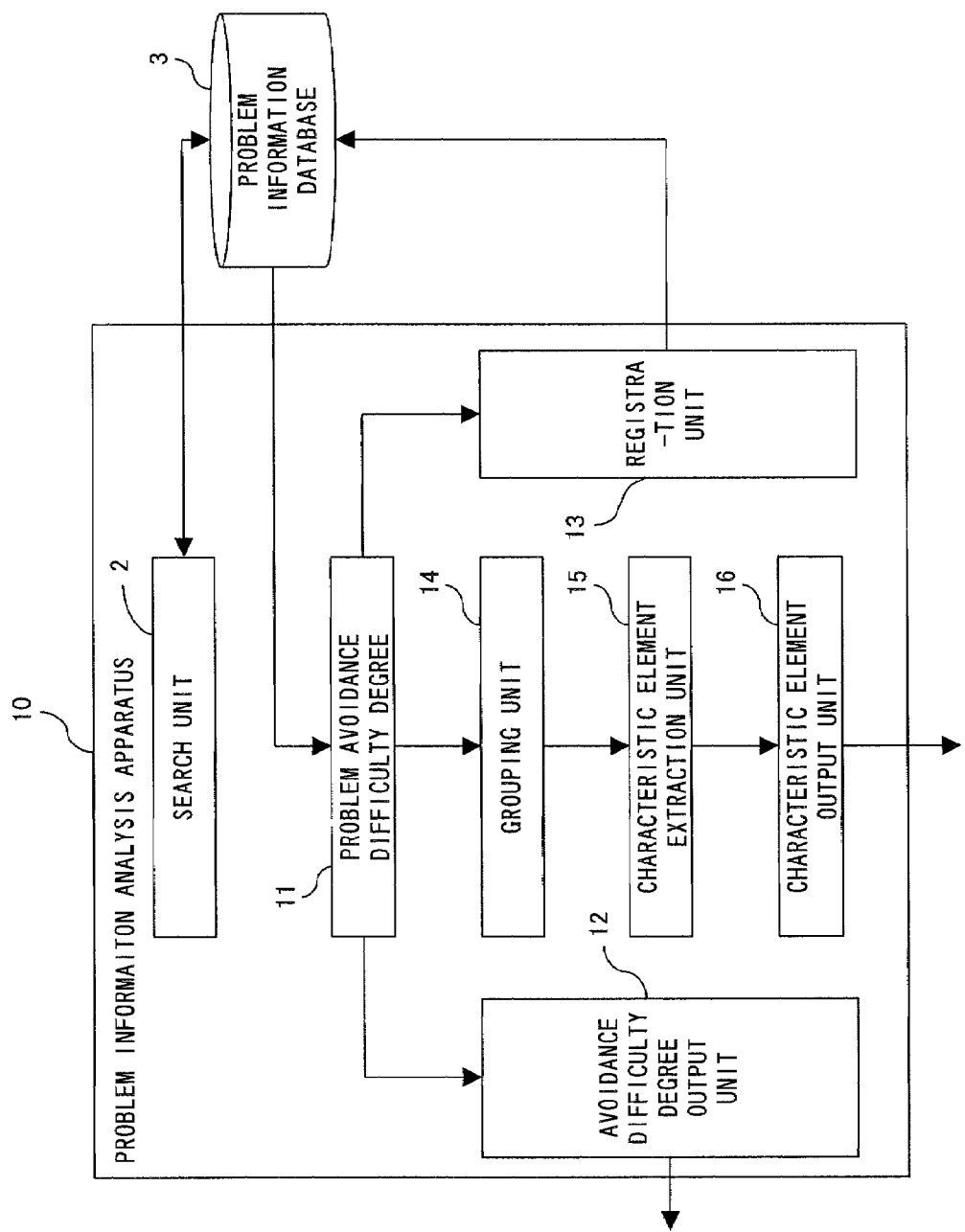
FIG. 2 shows the principle of the present invention.

FIG. 2 shows the principle of the present invention.

Referring to FIG. 2, a problem information analysis apparatus 10 comprises a search unit 2, a problem avoidance difficulty degree calculation unit 11, an avoidance difficulty degree output unit 12, a registration unit 13, a grouping unit 14, a characteristic element extraction unit 15 and a characteristic element output unit 16, with each problem case information being invested with detailed contents such as category, occurrence condition, and cause of the problem and a practiced countermeasure therefore as countable information.

The search unit 2 searches problem information corresponding to a search condition by referring to the problem information database 3 storing problem information including the category, occurrence condition, and cause of the problem and a practiced countermeasure therefore.

The problem avoidance difficulty degree calculation unit 11, according to a viewpoint, i.e., "A problem stemming from many causes is difficult to avoid", evaluates quantitatively a degree of difficulty of avoiding a problem based on a source cause for each category of problems. That is, the problem avoidance difficulty degree calculation unit 11 calculates a degree of difficulty of avoiding a problem which indicates a difficulty of avoiding the problem, based on the number of source causes of the problem searched from the problem information database 3. And the problem avoidance difficulty degree calculation unit 11 calculates a degree of difficulty of avoiding a problem based on an information entropy calculated from the number of source causes and number of occurrences of the problem.

Furthermore, the problem avoidance difficulty degree calculation unit 11, according to a viewpoint, i.e., "A problem occurring in many conditions is difficult to avoid", quantitatively evaluates a degree of difficulty of avoiding a problem based on occurrence conditions for each category of problems. That is, the problem avoidance difficulty degree calculation unit 11 calculates a degree of difficulty of avoiding a problem based on the number of occurrence conditions of the problem. The problem avoidance difficulty degree calculation unit 11 also calculates a degree of difficulty of avoiding a problem based on an information entropy calculated from the number of occurrence conditions and number of occurrences of the problem.

Moreover, the problem avoidance difficulty degree calculation unit 11, according to a viewpoint, i.e., "A problem having a small number of preventive measures is difficult to avoid", evaluates quantitatively a degree of difficulty of avoiding a problem based on the countermeasures for each category of problems. That is, the problem avoidance difficulty degree calculation unit 11 calculates a degree of difficulty of avoiding a problem based on the number of possible preventive measures for each category of problems. The problem avoidance difficulty degree calculation unit 11 also calculates a degree of difficulty of avoiding a problem based on an information entropy calculated from the number of possible preventive measures and number of occurrences of the problem.

Furthermore, the problem avoidance difficulty degree calculation unit 11, according to a viewpoint, i.e., "A problem occurring despite a preventive measure was taken is difficult to avoid", quantitatively evaluates a degree of difficulty of avoiding a problem based on a taken preventive measures at the time of occurrence for each category of the problem. That is, the problem avoidance difficulty degree calculation unit 11 calculates a degree of difficulty of avoiding a problem based on a presence or absence of a taken preventive measure for the problem. The problem avoidance difficulty degree calculation unit 11 also calculates a degree of difficulty of avoiding a problem based on an information entropy calculated from a presence or absence of a taken preventive measure and number of occurrences of the problem.

Moreover, the problem avoidance difficulty degree calculation unit 11, according to the function of evaluating an implementation cost of each noted countermeasure and a viewpoint, i.e., "A problem having only a high cost countermeasure is difficult to avoid", quantitatively evaluates a degree of difficulty of avoiding a problem based on an implementation cost of the countermeasure for each category of the problem. That is, the problem avoidance difficulty degree calculation unit 11 calculates a degree of difficulty of avoiding a problem based on a magnitude of a cost for implementing a preventive measure for the problem. The problem avoidance difficulty degree calculation unit 11 also calculates a degree of difficulty of avoiding a problem based on an information entropy calculated from the magnitude of a cost of implementing a preventive measure for the problem and number of occurrences thereof.

Furthermore, the problem avoidance difficulty degree calculation unit 11, according to the function of evaluating an effect of each noted countermeasure and a viewpoint, i.e., "A problem for which only a countermeasure with low effectiveness is available is difficult to avoid", quantitatively evaluates a degree of difficulty of avoiding a problem based on an effectiveness of the countermeasure for each category of the problem. That is, the problem avoidance difficulty degree calculation unit 11 calculates a degree of difficulty of avoiding a problem based on a magnitude of effectiveness of implementing a countermeasure for the problem. The problem avoidance difficulty degree calculation unit 11 also calculates a degree of difficulty of avoiding a problem based on an information entropy calculated from the magnitude of effectiveness of implementing the countermeasure for the problem and the number of occurrences thereof.

Then the avoidance difficulty degree output unit 12 outputs a degree of difficulty of avoiding a problem calculated by the problem avoidance difficulty degree calculation unit 11, while the registration unit 13 registers the degree of difficulty of avoiding a problem calculated by the problem avoidance difficulty degree calculation unit 11 in the problem information database 3.

And the grouping unit 14 groups categories of the problems based on the degree of difficulty of avoiding a problem calculated by the problem avoidance difficulty degree calculation unit 11.

Then, the characteristic element extraction unit 15 extracts a characteristic element stored by the problem information database 3 for the categories of the problems grouped by the grouping unit 14, while the characteristic element output unit 16 outputs the characteristic element extracted by the characteristic element extraction unit 15.

The next description is of a process for judging a degree of difficulty of avoiding a problem (i.e., a problem avoidance difficulty degree calculation process) carried out by the problem avoidance difficulty degree calculation unit 11.

Figure 3:
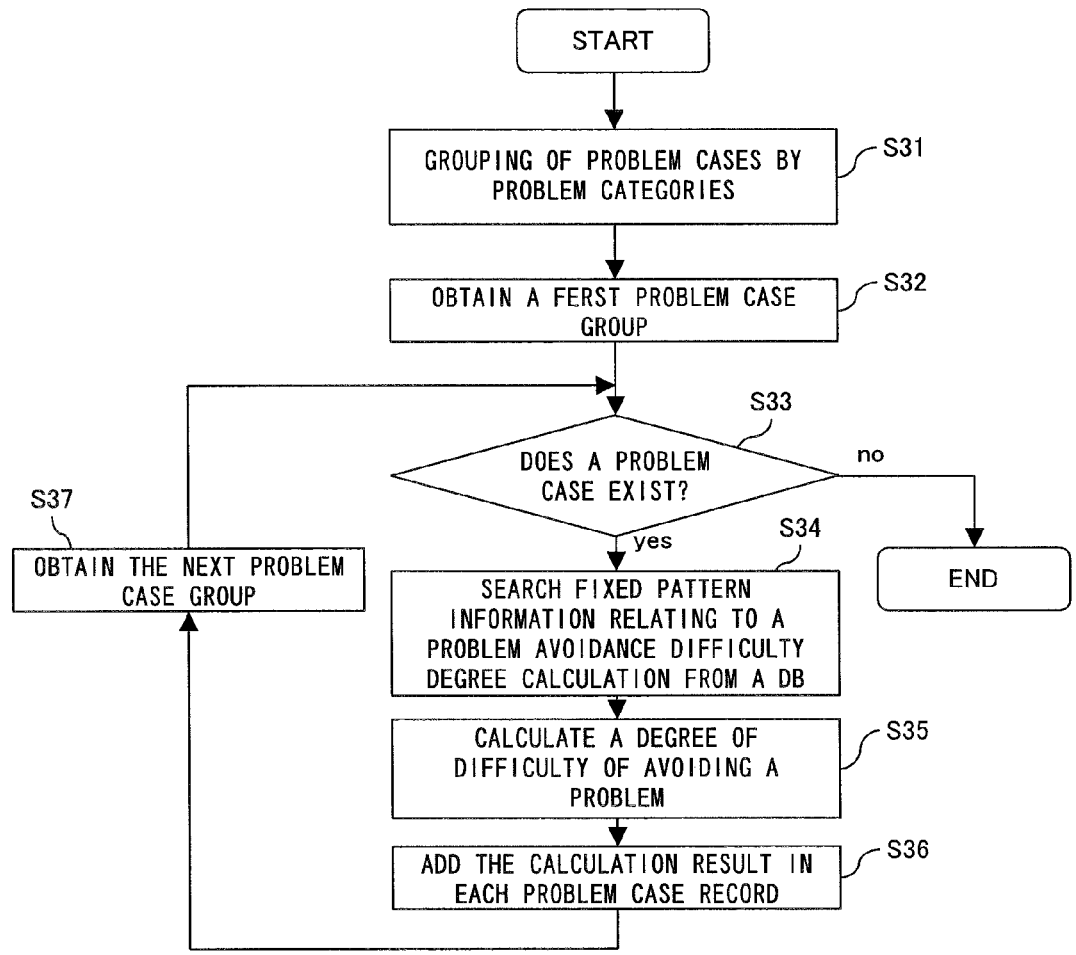
FIG. 3 is a flowchart showing a flow of a problem avoidance difficulty degree calculation process.

FIG. 3 is a flowchart showing a flow of a problem avoidance difficulty degree calculation process.

The problem avoidance difficulty degree calculation process is a process for judging a degree of difficulty of avoiding a problem from countable fixed pattern information attached to a problem case. The simplest method for implementing the process is to prepare a table of problem contents with each thereof being attached by a degree of difficulty of avoiding a problem. However, a degree of difficulty of avoiding a problem is intricately intertwined with various factors, making it very difficult to set an appropriate value. Therefore, a degree of difficulty of avoiding a problem is calculated for each category of the problem by a processing procedure as follows.

Note that, although the flow chart shown by FIG. 3 is a process for investing each record of the problem information database 3 with an estimated degree of difficulty of avoiding a problem, the calculation may be based on data stored by the problem information database 3 at every time of receiving a calculation instruction of a degree of difficulty of avoiding a problem from the user.

First, the step S31 groups problem cases according to problem category information invested therewith. Here, the problem category information is the one noting the content of problems as category information, e.g., problem category in a medical practice field includes "mistaken patient", "mistaken medicine administration", "mistaken medicine quantity administration", "tumble/drop".

The next step S32 obtains necessary information, from the problem information database 3, at the time of calculating a degree of difficulty of avoiding a problem based on a certain viewpoint for each group of generated problem cases. Here, the obtained information is, for example, fixed pattern information which shows causes, e.g., "failure to follow procedure", "overlook", miscommunication", et cetera, in the case of calculating a degree of difficulty of avoiding a problem based on the viewpoint of "A problem stemming from many causes is difficult to avoid".

FIG. 4 exemplifies problem case data of a problem information database.

In the example shown by FIG. 4, a record is invested with fixed pattern information, e.g., the occurrence spot, occurrence condition, problem category, et cetera, as outline problem information, along with the occurrence date and time, patient information, and involved party/fact finder. A degree of difficulty of avoiding a problem is calculated for each of various problems from these pieces of fixed pattern information. And a field is provided for noting details of the problem as a non-fixed pattern information noting field from which key words in the form of non-fixed pattern information that indicate factors, et cetera.

Now returning to the description of FIG. 3, the step S33 judges whether or not a problem case exists and, if one does not exist ("no" for the step S33), this problem avoidance difficulty degree calculation process ends. If the one exists ("yes" for the step S33), the step S34 searches fixed pattern information relating to calculation of a degree of difficulty of avoiding a problem from the problem information database 3.

The next step S35 quantitatively calculates a degree of difficulty of avoiding a problem from the obtained fixed pattern information. The method of the calculation, if the calculation is based on the viewpoint of "A problem stemming from many causes is difficult to avoid" for example, is equivalent to acquiring the number of individual differences of causes for a single problem category. For example, in the case of cause information and the number of occurrences being "failure to follow procedure: 45 occurrences", "overlook: 50 occurrences" and "miscommunication: 5 occurrences" in 100 problem cases under the problem category of "mistaken patient", the number of individual differences of causes is three (3) and therefore the degree of difficulty of avoiding a problem is three (3) according to the above described calculation method.

Also, it is possible to calculate a degree of difficulty of avoiding a problem by considering not only the above described simple number of individual differences but also the number of occurrences. For instance, a use of the method of setting a threshold value (e.g., 10%) and adding only cause(s) whose ratio of the number of problem occurrences exceeds the threshold value to the number of individual differences, thereby making it possible to calculate the number of individual differences by ignoring a cause having little influence to the relevant problem. In this case the degree of difficulty becomes two (2). It is further possible to use a more complex expression, such as an information entropy defined for an information theory as an evaluation value. The information entropy is represented by the following expression:

$$InformationEntropy = -\sum_i P_i \log_2 P_i;$$

where $P_i$ is the probability of a cause being the cause "i" for a certain problem category. In the case of the above described problem case for example, there are three (3) causes in one hundred (100) problems of the problem category of "mistaken patient", with the respective number of occurrences being forty-five (45), five (5) and fifty (50), hence $P_1=0.45$, $P_2=0.5$ and $P_3=0.05$. Therefore, the information entropy is calculated to be 1.2345. If there is only one cause of a problem, $P_1$ is equal to 1.00 and therefore the information entropy is zero (0). Even if there are three causes as in the above described problem case, if the numbers of occurrences due to these three causes are the same, hence $P_1=P_2=P_3=\frac{1}{3}$, and therefore the information entropy calculated from this is 1.58347, resulting in the degree of difficulty of avoiding a problem being higher than the above problem case. This evaluates numerically that, if problems due to three causes occur in the same frequency, countermeasures to only two causes can merely prevent two-thirds of all problems, as compared to the distribution of the number of occurrences in the above described problem case for which countermeasures to the top two causes in terms of the number of problem occurrences suppress a 95% of problem occurrences. This identifies with a human intuition.

The present problem avoidance difficulty degree calculation process also quantitatively calculates a degree of difficulty of avoiding a problem according to the viewpoint of "A problem occurring in many conditions is difficult to avoid". This is an evaluation based on knowledge that, in order to prevent a problem which occurs in one scene (e.g., "at administering medicine") or one occurrence spot (e.g., "patient room"), it is adequate to take measures regarding the scene or occurrence spot, whereas a problem occurring in various scenes or spots requires respective countermeasures, hence a prevention thereof is inevitably difficult. For this calculation, it is possible to calculate an evaluation value quantitatively by extracting fixed type information which indicates an occurrence scene for each problem category and the same method as the process based on the viewpoint of "A problem stemming from many causes is difficult to avoid".

And the present problem avoidance difficulty degree calculation process also quantitatively calculates a degree of difficulty of avoiding a problem according to the viewpoint of "A problem having a small number of preventive measures is difficult to avoid, and a degree of difficulty of avoiding a problem is high". This is an evaluation based on knowledge that an appropriate countermeasure can be easily carried out by combining other conditions for a problem having many possible preventive measures, whereas the case of possible countermeasures are limited has a high probability of being difficult to put the preventive measures into practice depending on other conditions. Relating to the problem of "mistaken medicine order" for instance, if a countermeasure for it is only "introduction of the latest order system", an adoption of the countermeasure may be difficult due to a budgetary constraint. If a countermeasure of "invest with a check list", however, is known to exist, taking measures becomes very easy. As such, the phenomena are evaluated.

For calculating such evaluation value, an applicable method is to obtain fixed pattern information indicating a countermeasure for each problem case from the problem data base 3, followed by applying an expression having an inverse correlation with the number of differences, e.g., an inverse of the number of differences, or a linear expression having a negative inclination, et cetera. It is also possible to calculate first an evaluation value of the number of differences by considering the number of occurrences as described above, followed by applying an expression having an inverse correlation with the value.

The present problem avoidance difficulty degree calculation process also calculates a degree of difficulty of avoiding a problem according to the viewpoint of "A problem occurring despite a preventive measure was taken is difficult to avoid". This is useful information for discriminating a problem of which an appropriate countermeasure is not practiced although the problem to be avoided is recognized. For instance, if many instances of the problem apparently occur even though a countermeasure of "fixing both arms" has been put into practice in the case of the problem category of "dislodged feeding tube", the countermeasure predictably has a certain shortcoming. In this event, an obtainment of such problem cases from the problem information database 3 and a reference to a free description text record noted with a detail of the problem enable an acquisition of know-how for practicing countermeasures such as "this is sometimes ineffective due to a bodily movement", or "connecting to the bed fence loses a fixing capability".

An evaluation value according to this viewpoint can also be quantitatively calculated by obtaining fixed pattern information indicating a practiced countermeasure at a problem occurrence from the problem information database 3 and a ratio of the number of problem occurrences, in spite of practicing the countermeasure, to the total number of problem occurrences. Alternatively, it is possible to evaluate, by the above described calculation method, the number of differences of the kinds of countermeasures which have been practiced.

It is also possible to focus on a practice cost of a countermeasure as a factor for determining a degree of difficulty of avoiding a problem. That is, it is possible to regard a problem of which a practice cost of a countermeasure is high as the one having a high degree of difficulty of avoiding a problem. Evaluation of a degree of difficulty of avoiding a problem according to this viewpoint requires preparation of a second practice cost database (DB) noted by a practice cost for each countermeasure in addition to the problem information database 3, obtainment of fixed pattern information indicating a countermeasure for each problem category from the problem information database 3, reference to the second practice cost DB for each obtained countermeasure, obtainment of a practice cost for each countermeasure and calculation of the aforementioned degree by using the value of the obtained practice cost. The calculation method includes the average or minimum values of a practice cost of a countermeasure simply for a single problem category. It is also possible to evaluate an effectiveness of each countermeasure, as a numerical value, by using a function of evaluating the effectiveness of the countermeasure in lieu of a practice cost and use a value which is the aforementioned numerical value divided by the practice cost for a calculation of a degree of difficulty of avoiding a problem.

It is also possible to quantitatively calculate a degree of difficulty of avoiding a problem according to the viewpoint of "A problem for which only a countermeasure with low effectiveness is available is difficult to avoid" considering an effectiveness of a countermeasure by using the function for evaluating the effectiveness of a countermeasure. A method for evaluating the effectiveness can take advantage of a conventional technique (e.g., a Laid-Open Japanese Patent Application Publication No. 2001-155081). A use of this technique makes it possible to acquire an effectiveness of each countermeasure as a numerical value, thereby enabling a definition of a degree of difficulty of avoiding a problem by an expression having an inverse correlation with a value based on the value of an effectiveness evaluation for the most effective countermeasure for each problem category. It is also possible to utilize the minimum value or average value for the calculation in lieu of the maximum value of the effectiveness evaluation value.

The above described methods are capable of evaluating a degree of difficulty of avoiding a problem from various viewpoints. It may of course be possible to calculate degrees of difficulty of avoiding a problem from a plurality of viewpoints to acquire an integrated degree of difficulty of avoiding a problem of a problem by simply averaging the aforementioned degrees of difficulty, or comprise the function of displaying degrees of difficulty of avoiding a problem from the respective viewpoints as a radar chart. It may also be possible to comprise the function of a user selecting either one of the viewpoints by which a degree of difficulty of avoiding a problem depending on an analysis purpose of the user.

Now, the following are more specific descriptions of calculating a degree of difficulty of avoiding a problem according to the respective viewpoints by taking simplified examples.

FIG. 5 exemplifies a record within a problem information database relating to a problem category, i.e., "mistaken administration of medicine".

The example shown by FIG. 5 shows three problem cases being searched so as to calculate a degree of difficulty of avoiding a problem according to each viewpoint.

[Viewpoint 1 (Cause Category)]

Counting a fixed pattern information field of "cause category" brings forth "mis-operation of equipment: one (1) occurrence", "confirmation failure: one (1) occurrence", "miscommunication: two (2) occurrences" and "manual shortcoming: one (1) occurrence", and therefore the number of differences of cause categories is four (4). From this result, the degree of difficulty of avoiding a problem according to the viewpoint 1 is calculated as four (4) for example.

[Viewpoint 2 (Occurrence Condition)]

The fixed pattern information of "occurrence conditions" is all "injection and drip infusion", while the fixed pattern information of "occurrence place" are all different, i.e., "patient room", "nurse station" and "treatment room". This means that a countermeasure is necessary for each occurrence place, thus making a degree of difficulty of avoiding a problem high. As a result, the degree of difficulty of avoiding a problem according to the viewpoint 2 is defined as "the number of differences of occurrence conditions multiplied by the number of differences of occurrence places for example, and hence it is three (3).

[Viewpoint 3 (Preventive Measure)]

The fixed pattern information of "countermeasure" lists two items, i.e., "enforce the procedure" and "make manual and notify". According to the viewpoint 3, a smaller number of countermeasure kinds makes a degree of difficulty of avoiding a problem high, and accordingly, a definition of a degree of difficulty of avoiding a problem according to the viewpoint 3 as five (5) (i.e., the number of differences of countermeasures) is three (3).

[Viewpoint 4 (Presence or Absence of a Preventive Measure)]

From the fixed pattern information of "presence or absence of a preventive measure and its content", it is apparent that all the preventive measures have been put into practiced for these three occurrences. That is, the practiced ratio of preventive measures is 100% and therefore a degree of difficulty of avoiding a problem according to the viewpoint 4 is judged to be very high. As a result, the degree of difficulty of avoiding a problem is judged to be three (3) based on the below described calculation rule of the degree of difficulty of avoiding a problem for example:

Degree of difficulty 1: for a practiced ratio of preventive measures at less than 20%

Degree of difficulty 2: for a practiced ratio of preventive measures of 20% or higher and less than 50%

Degree of difficulty 3: for a practiced ratio of preventive measures of 50% or higher

[Viewpoint 5 (Countermeasure Cost)]

The value of the fixed pattern information "countermeasure cost" is judged as a rank B at best, and other countermeasures are judged to hardly cost (i.e., a rank C). Based on this, using a calculation expression for a degree of difficulty of avoiding a problem for the viewpoint 5 as 2*(the number of countermeasures costing A)+1*(the number of countermeasures costing B)+0.2*(the number of countermeasures costing C) for example calculates the degree of difficulty of avoiding a problem to be 1.6.

[Viewpoint 6 (Countermeasure Effectiveness)]

The evaluation value of the fixed pattern information "countermeasure effectiveness" is judged as rank B (ordinary) at best, and other countermeasures are judged as a rank C (e.g., a low effectiveness). Based on this, using a calculation expression for a degree of difficulty of avoiding a problem for the viewpoint 6 as 5−2*(the number of countermeasures of an effectiveness of rank A)−1*(the number of countermeasures of an effectiveness of rank B)−0.5*(the number of countermeasures of an effectiveness of rank C) for example calculates the degree of difficulty of avoiding a problem to be three (3).

Incidentally, the above described example calculates the degrees of difficulty of avoiding a problem for respective viewpoints by a simple calculation method and therefore a reference for a value of degrees of difficulty of avoiding a problem among the viewpoints is not unified. That is, the severity of a degree of difficulty of avoiding a problem, i.e., "3" according to the viewpoint 1, can be totally different from that of a degree of difficulty of avoiding a problem, i.e., "3" according to the viewpoint 2. In order to unify a reference of the severity for each viewpoint, what can be carried out is, first, calculating the above described degree of difficulty of avoiding a problem for each problem category, acquiring a distribution of the degrees of difficulty of avoiding a problem, and investing with a unified degree of difficulty of avoiding a problem sequentially based on the distribution such as a degree of difficulty of avoiding a problem of "5" for less than 20% from the top thereof, a degree of difficulty of avoiding a problem of "4" for 20% or greater and less than 40% from the top, et cetera.

Now returning to the description of FIG. 3, the step S36 outputs the calculation result of the degree of difficulty of avoiding a problem and adds it to each problem case record.

FIG. 6 exemplifies an addition of a calculated degree of difficulty of avoiding a problem to a problem information database.

The above described method can invest each problem case with a unified degree of difficulty of avoiding a problem for each problem category. FIG. 6 shows an example of calculating a unified degree of difficulty of avoiding a problem based on the calculation result of the degree of difficulty of avoiding a problem for the above described each viewpoint and adding this to a problem case record of the problem information database 3.

Once again returning to the description of FIG. 3, the step S37 obtains the next problem case group to repeat the step S33 and thereafter.

The next description is of a process for extracting a characteristic element (i.e., a characteristic element extraction process) from the problem case group, carried out by the characteristic element extraction unit 15.

Figure 7:
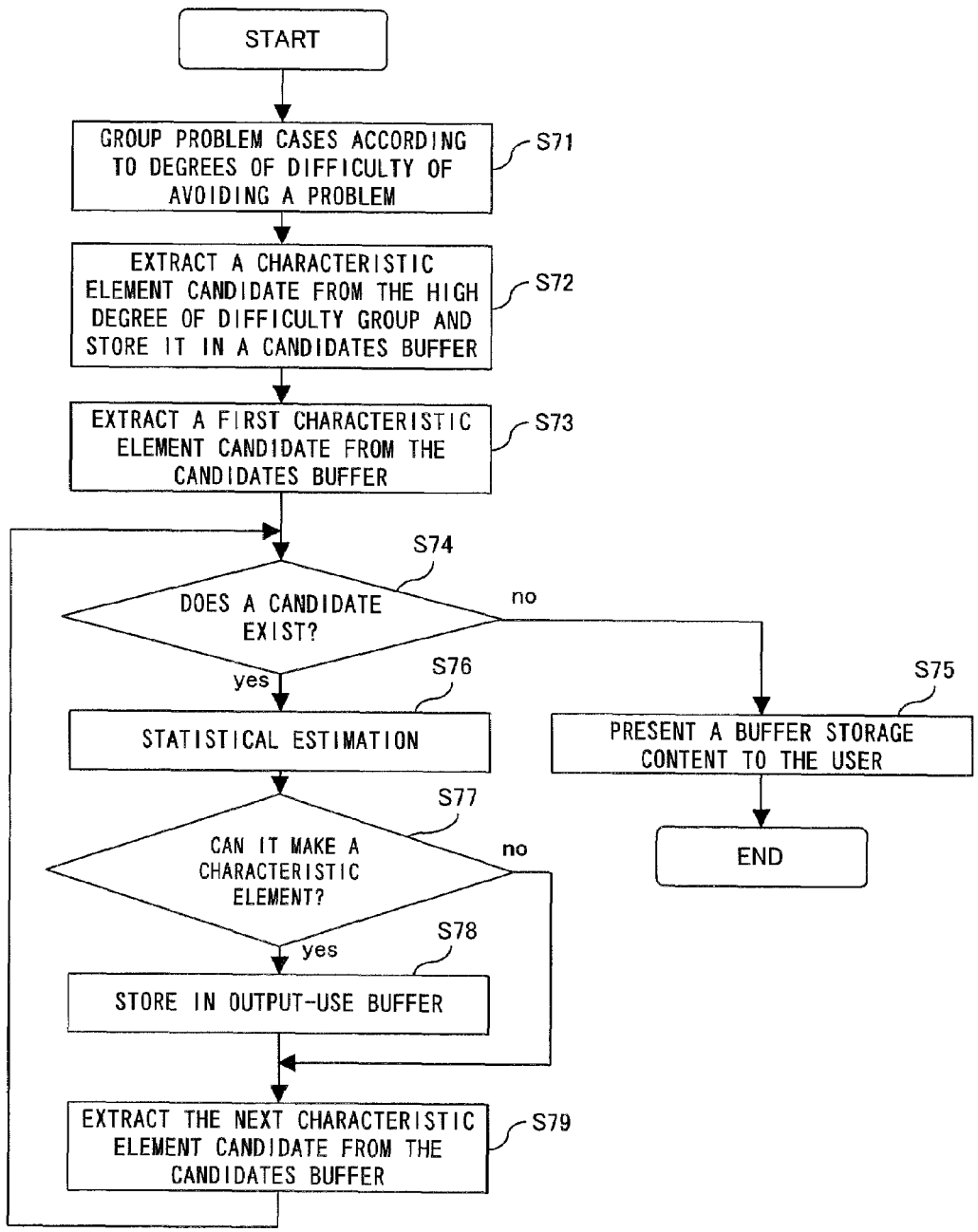
FIG. 7 is a flow chart showing a flow of a characteristic element extraction process.

FIG. 7 is a flowchart showing a flow of the characteristic element extraction process.

The flow chart shown by FIG. 7 is the one for grouping problem cases according to degrees of difficulty of avoiding a problem and extracting a characteristic element, which characterizes a problem case group, from the group with a high degree of difficulty of avoiding a problem. However, a similar process can extract a characteristic element of a discretionary group.

Here, the characteristic elements conceivably include fixed pattern information (i.e., quantifiable and/or codable information such as work hours and a day of the week of a problem occurrence) with which problem cases are invested, a key word or a phrase included in a text within a problem case, et cetera. An extraction of these characteristic elements can be accomplished by conventional statistical processing such as a weighting by a vector space method (TF-IDF) and a weighting by a $\chi$ square value. For instance, it is assumed that a hundred (100) problem cases are divided by degrees of difficulty of avoiding a problem into two groups, i.e., the group A with a low degree of difficulty of avoiding a problem and group B with a high degree of difficulty of avoiding a problem, with the two groups containing fifty (50) problem cases respectively.

Also assuming that counting words within texts included in the groups A and B finds that a certain key word X appears ten (10) times in the group A and a hundred (100) times in the group B, then the distribution of the key word X is apparently biased intuitively so as to be a characteristic element indicating a characteristic of the group B. The present embodiment is configured to carry out such a judgment by a statistical test process. In the case of the above described example, an application of the statistical treatment called the $\chi$ square test to the key word X results in it being a characteristic element with a certainty factor of 99% or greater. Note that, in the case of outputting something identified as characteristic element(s), it is also possible to present only the higher ranked characteristic elements in terms of evaluation values which are calculated at the time of judgment, in lieu of outputting all of the identified characteristic elements.

This enables the user to use key words presented as described above for estimating causal factors of which problems are difficult to avoid as a result of extracting, and presenting to the user, the key words which characteristically appear only in a text noting details of a problem case with a high degree of difficulty of avoiding a problem for example.

First, the step S71 groups problem cases based on degrees of difficulty of avoiding a problem, that is, categorizes the problem cases stored by the problem information database 3 based on the degrees of difficulty of avoiding a problem calculated by the problem avoidance degree calculation process executed by the problem avoidance difficulty degree calculation unit 11.

The next step S72 applies a morphological analysis to a text noting a problem detail of each problem case which belongs to the group of a high degree of difficulty of avoiding a problem, extracts compound word(s) comprising a noun or a continuation of nouns within a text and store them in a candidates buffer.

Then the step S73 extracts a first candidate of characteristic element from the candidates buffer storing compound word(s) which have been extracted in the step S72, followed by the step S74 to judge whether or not a candidate exists.

If the step S74 judges a candidate not existing ("no" for S74), the step S75 presents the content stored by the candidates buffer to the user, followed by ending the present characteristic element extraction process.

Contrarily, if the step S74 judges a candidate existing ("yes" for S74), the step S76 carries out the above described statistical estimation and the step S77 judges whether or not the candidate can make a characteristic element.

If the step S77 judges that the candidate cannot make a characteristic element ("no" for S77), the process proceeds to the step S79, while, if the candidate is judged to make a characteristic element ("yes" for S77), then the step S78 stores the characteristic element in an output-use buffer, together with its evaluation value.

Then the step S79 extracts the next characteristic element candidate from the candidates buffer, followed by repeating the step S74 and thereafter.

Once the characteristic element extraction processes carried out by the characteristic element extraction unit 15 complete for all of candidates as described above, the characteristic element output unit 16 presents the characteristic elements stored by the output-use buffer to the user. Although a method for outputting them may simply be for all of the characteristic elements, other various methods may conceivably be appropriate, e.g., outputting by sorting in the order of higher evaluation values, setting a certain threshold value and outputting only the characteristic elements whose evaluation value exceed the threshold value, or outputting the only ones of the rank order of the set evaluation values.

This configuration enables a discovery of common factor(s) which raises degrees of difficulty of avoiding a problem among a plurality of problems. For instance, two problem cases, i.e., "mistaken kind of administering medicine" and "mistaken issuance of a prescription (i.e., the prescription has been handed to a wrong patient)" in a medical practice spot, are both apparently judged to have high degrees of difficulty of avoiding a problem in terms of the fact that the problem has not been completely prevented despite that a validation process is put into practice in order to prevent the aforementioned problems. Here, extracting key words, as characteristic elements, within a text relating to the group of the "mistaken kind of administering medicine" first brings forth a list of medicines, e.g., "Saxin", "Saxizon", Taxotale", "Taxsol", et cetera. Meanwhile, Katakana (i.e., a series of phonetic Japanese characters) (N.B.: the aforementioned example medicine names are usually written by Katakana in Japan) is generally used for patients to be handed out prescriptions, and therefore an extraction of characteristic key words for the one set gathering the two problem categories with high degrees of difficulty of avoiding a problem lists "Katakana" in a higher rank.

From the above described result, it is easily predicted that a misreading of similar names or medicine names can occur in high probabilities when a person validates a patient name or medicine name which are noted in Katakana. That is, knowledge can be acquired that an addition of validation by other piece(s) of information (e.g., validations of patient name by Kanji (Chinese) characters and/or patient ID, or color-coding of medicine bottles. et cetera) is effective in addition to a conventional validation only by information noted in Katakana, in order to prevent these two problems.

Note that the above described embodiment according to the present invention can be implemented by hardware, firmware by way of a DSP (digital signal processor) board or a CPU board, or software as one function of a problem information analysis.

While the preferred embodiment according to the present inventions has been described by referring to the accompanying drawings, it is apparent that a problem information analysis apparatus applied by the present invention may be a single apparatus, a system or an integrated apparatus which comprise a plurality of apparatuses, or a system in which processing is carried out by way of a network such as LAN (local area network) or WAN (wide area network) as far as the function of the problem information analysis apparatus is accomplished, in lieu of being limited by the above described embodiment.

Alternatively, the present invention can be implemented by a system comprising a CPU (central processing unit) 81, memory 82 such as ROM (read only memory) or RAM (random access memory), an input apparatus 83, an output apparatus 84, an external recording apparatus 85, a media drive apparatus 86 and a network connection apparatus 87 which are all interconnected by a bus 88 as shown by FIG. 8. That is, the present invention is obviously implemented by supplying a problem information analysis apparatus with the memory 82 such as ROM or RAM, external recording apparatus 85 or portable recording medium 89 which record a program code of software implementing a system according to the above described embodiment, and by a computer of the problem information analysis apparatus reading out and executing the program code.

In this case, the program code per se read from the portable recording medium 89, et cetera, results in implementing new functions of the present invention, thus meaning that the portable recording medium 89, et cetera, recording the program code comprises the present invention.

The portable recording medium 89 for the purpose of supplying a program code can utilize various recording media, e.g., flexible disk, hard disk, optical disk, magneto optical disk, CD-ROM, CD-R, DVD-ROM, DVD-RAM, magnetic tape, nonvolatile memory card and ROM card, which records by way of the network connection apparatus 87 (i.e., a telecommunication line, in other words) such as e-mail and PC (personal computer) communication.

Figure 9:
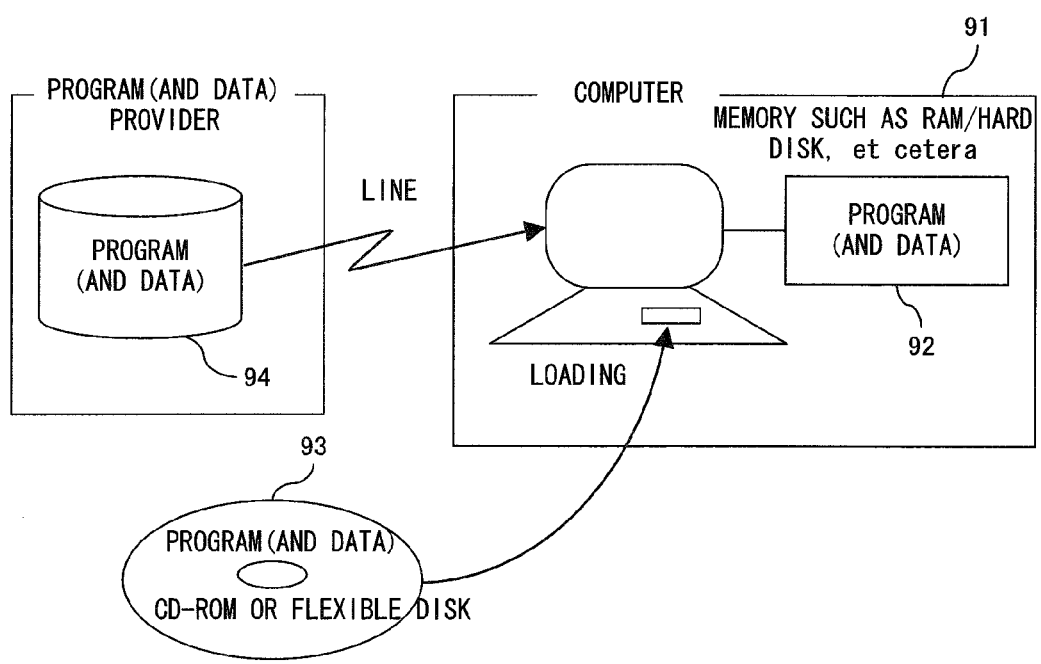
FIG. 9 describes a loading of a problem information analysis program to a computer according to the present invention.

Meanwhile, the function of the above described embodiment is implemented by a computer (i.e., an information processing apparatus) 91 executing a program code read out to memory 92, and also the function thereof is implemented by the OS (operating system) operating in the computer 91 executing a part or the entirety of the actual processing as shown by FIG. 9.

Furthermore, a program code which is read from a portable recording medium 93 or a program (and data) 94 provided by a program (and data) provider is written to memory 92 comprised by a function extension board inserted into the computer 91 or a function extension unit connected thereto, followed by a CPU, et cetera, comprised by the function extension board and function extension unit carrying out a part or the entirety of the actual processing, thereby implementing the function of the above described embodiment.

That is, the present invention can adopt various configurations or forms within the scope thereof, in lieu of being limited by the above described embodiment.

The present invention invests a problem case with information of a calculated degree of difficulty of avoiding a problem and presents, to the user, a characteristic element of a problem case group which is created by a user operation, thereby enabling assistance to a work for acquiring useful knowledge which contributes to an avoidance of problem.

That is, the present invention can judge a problem category to be responded to in high priority by adding a degree of difficulty of avoiding a problem to the occurrence ratio and influence of a problem which are calculated by the conventional technique. Therefore, an effective countermeasure can be put into practice by judging that a problem whose degree of difficulty of avoiding a problem is low is easy to handle and the priority of taking measures is high.

The present invention can also discover a common factor raising degrees of difficulty of avoiding a problem in a plurality thereof.

What is claimed is:

1. A computer readable recording medium storing a computer executable problem information analysis program, which when executed by a problem information analysis apparatus, causes the apparatus to perform a method, the method comprising:

searching a problem information database for problem information using a search condition, the problem information database including a category, an occurrence condition, a source cause of a problem concerning incident information occurring in a medical practice site and a countermeasure for the problem;

calculating a degree of difficulty of avoiding the problem, which indicates a difficulty of avoiding the problem, based on the number of source causes of the problem obtained from the searching; and outputting the calculated degree of difficulty of avoiding the problem.

2. The computer readable recording medium according to claim 1, wherein calculating the degree of difficulty calculates the degree based on an information entropy calculated from the number of source causes and number of occurrences of said problem.

3. The computer readable recording medium according to claim 1, wherein calculating the degree of difficulty calculates the degree based on the number of occurrence conditions of said problem.

4. The computer readable recording medium according to claim 1, wherein calculating the degree of difficulty calculates the degree based on an information entropy calculated from the number of occurrence conditions and number of occurrences of said problem.

5. The computer readable recording medium according to claim 1, wherein the calculating the degree of difficulty calculates the degree based on the number of possible preventive measures for said problem.

6. The computer readable recording medium according to claim 1, wherein the calculating the degree of difficulty calculates the degree based on an information entropy calculated from the number of possible preventive measures and number of occurrences of said problem.

7. The computer readable recording medium according to claim 1, wherein the calculating the degree of difficulty calculates the degree based on a presence or absence of taking a preventive measure for said problem.

8. The computer readable recording medium according to claim 1, wherein the calculating the degree of difficulty calculates the degree based on an information entropy calculated from a presence or absence of taking a preventive measure for said problem and the number of occurrences thereof.

9. The computer readable recording medium according to claim 1, wherein the calculating the degree of difficulty calculates the degree based on a high or low cost of taking a preventive measure for said problem.

10. The computer readable recording medium according to claim 1, wherein the calculating the degree of difficulty calculates the degree based on an information entropy calculated from a magnitude of a cost of a taken preventive measure for said problem and the number of occurrence thereof.

11. The computer readable recording medium according to claim 1, wherein the calculating the degree of difficulty calculates the degree based on a degree of effectiveness of a taken preventive measure for said problem.

12. The computer readable recording medium according to claim 1, wherein the calculating the degree of difficulty calculates the degree based on an information entropy calculated from a degree of effectiveness of a taken preventive measure for said problem and the number of occurrences thereof.

13. The computer readable recording medium according to claim 1, wherein the method further comprising:

registering the calculated degree of difficulty in said problem information database.

14. The computer readable recording medium according to claim 1, the method further comprising:

grouping categories of said problem based on degrees of difficulty calculated by said calculating;

extracting a characteristic element stored in said problem information database relating to a category of said problem which is grouped by the grouping; and outputting a characteristic element extracted by the extracting.

15. A problem information analysis method carried out by a problem information analysis apparatus, the method comprising:

searching a problem information database for problem information using a search condition, the problem information database including a category, an occurrence condition, a source cause of a problem concerning incident information occurring in a medical practice site, and a countermeasure for the problem;

calculating a degree of difficulty of avoiding the problem, which indicates a difficulty of avoiding the problem, based on the number of source causes of the problem obtained from the searching; and outputting the calculated degree of difficulty of avoiding the problem.

16. The problem information analysis method according to claim 15, wherein the calculating the degree of difficulty of calculates the number of occurrence condition of said problem.

17. The problem information analysis method according to claim 15, wherein the calculating the degree of difficulty calculates the degree based on the number of possible preventive measures for said problem.

18. A problem information analysis apparatus comprising:

a search unit to search a problem information database for problem information using a search condition, the problem information database including a category, an occurrence condition, a source cause of a problem concerning incident information occurring in a medical practice site, and a countermeasure for the problem;

a problem avoidance difficulty calculation unit to calculate a degree of difficulty of avoiding the problem, which indicates a difficulty of avoiding the problem, based on the number of source causes of the problem obtained by the search unit from the problem information database; and an avoidance difficulty degree output unit to output the calculated degree of difficulty of avoiding the problem calculated by the calculation unit.

19. A problem information analysis apparatus comprising:

a searching means for searching a problem information database for problem information using a search condition, the problem information database including a category, an occurrence condition, a source cause of a problem concerning incident information occurring in a medical practice site, and a countermeasure for the problem;

problem avoidance difficulty calculation means for calculating a degree of difficulty of avoiding the problem, which indicates a difficulty of avoiding the problem, based on the number of source causes of the problem searched from the problem information database; and avoidance difficulty degree output means for outputting the degree of difficulty of avoiding the problem calculated by the calculation means.

\* \* \* \* \*